US008066058B2

(12) United States Patent
Daniel et al.

(10) Patent No.: US 8,066,058 B2

(45) Date of Patent: Nov. 29, 2011

(54) SYSTEM, METHOD, AND APPARATUS FOR BREAKING FRACTURING FLUIDS

(75) Inventors: Sylvie Daniel, Missouri City, TX (US); Marie Noelle Dessinges, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/975,868

(22) Filed: Dec. 22, 2010

(65) Prior Publication Data

US 2011/0088888 A1 Apr. 21, 2011

Related U.S. Application Data

(62) Division of application No. 12/200,500, filed on Aug. 28, 2008, now Pat. No. 7,857,048.

(51) Int. Cl.
*E21B 43/26* (2006.01)
*E21B 47/06* (2006.01)

(52) U.S. Cl. ....... 166/53; 166/64; 166/75.11; 166/177.5

(58) Field of Classification Search ........................ None
See application file for complete search history.

(56) References Cited

U.S. PATENT DOCUMENTS 5,103,905 A * 4/1992 Brannon et al. ........... 166/250.1
5,253,711 A 10/1993 Mondshine
5,591,700 A * 1/1997 Harris et al. .................. 507/214
5,624,886 A 4/1997 Dawson et al.
6,192,985 B1 * 2/2001 Hinkel et al. ............. 166/280.1
6,613,720 B1 9/2003 Feraud et al.
6,763,888 B1 7/2004 Harris et al.
6,983,801 B2 1/2006 Dawson et al.
7,036,590 B2 5/2006 Harris
2004/0211558 A1 * 10/2004 Morales et al. ............ 166/250.1
2008/0099207 A1 * 5/2008 Venditto et al. ............ 166/308.3

* cited by examiner

*Primary Examiner* — George Suchfield

(74) *Attorney, Agent, or Firm* — Michael M. Dae; Michael Flynn; David Cate

(57) ABSTRACT

A method for breaking a fracturing fluid includes identifying application parameter(s) including a subterranean formation temperature, and determining an acid precursor concentration in response to the application parameter(s). The method further includes providing a treatment fluid including a carrier fluid, a metallic peroxide breaker, and an amount of an acid precursor according to the acid precursor concentration, and treating the subterranean formation with the treatment fluid. The application parameter(s) may further include a flowback wait time, a composition of the metallic peroxide breaker, a gel loading of the carrier fluid, and/or a permeability of the subterranean formation. The metallic peroxide breaker may include an alkaline peroxide and/or a zinc peroxide. The acid precursor may include polylactic acid and/or polyglycolic acid.

13 Claims, 8 Drawing Sheets

SYSTEM, METHOD, AND APPARATUS FOR BREAKING FRACTURING FLUIDS

CROSS REFERENCE

This application is a divisional application of U.S. patent application Ser. No. 12/200,500, now U.S. Pat. No. 7,857,048, filed Aug. 28, 2008, entitled, "System, Method, and Apparatus for Breaking Fracturing Fluids," and is incorporated herein by reference.

The present application is related to the application "SYSTEM, METHOD, AND APPARATUS FOR BREAKING FRACTURING FLUIDS" filed on Aug. 28, 2008, assigned to the same assignee as the present application, and incorporated herein by reference.

FIELD OF THE INVENTION

The present invention relates to breaking fracturing fluids in wells, and more particularly but not exclusively relates to breaking fracturing fluids in intermediate temperature formations.

BACKGROUND

The statements in this section merely provide background information related to the present disclosure and may not constitute prior art.

Hydraulic fracturing of wells is a common treatment to enhance the productivity or the injectivity of a well. Fracturing fluids typically have a high viscosity during a treatment to develop a desired fracture geometry and/or to carry proppant into a formation with sufficient resistance to settling. However, it is desirable that the fracturing fluid have a low viscosity after the treatment is completed to allow for easier flowback and to prevent damage to the formation and fracture permeability. Conventional fracturing fluid breaking technologies are known and work well at relatively low and high temperatures, but are not as effective in some intermediate temperature ranges. Accordingly, there is a demand for further improvements in this area of technology.

SUMMARY

One embodiment is a unique treatment fluid for fracturing and breaking fracturing fluids. Other embodiments include unique systems and methods to treat subterranean formations. Further embodiments, forms, objects, features, advantages, aspects, and benefits shall become apparent from the following description and drawings.

DESCRIPTION OF THE ILLUSTRATIVE EMBODIMENTS

Figure 1:
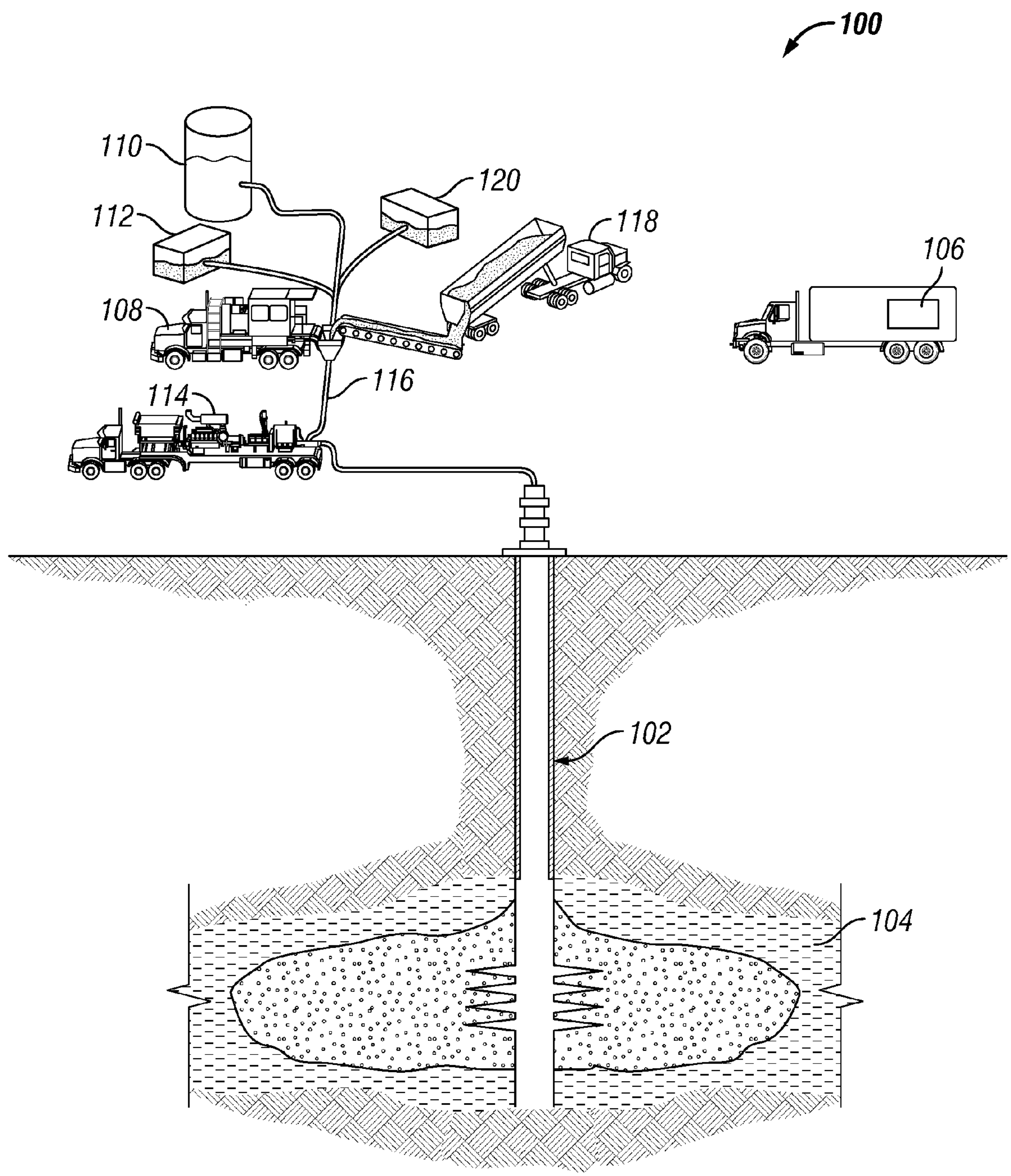
FIG. 1 is a schematic diagram of a system for breaking a fracturing fluid.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations and further modifications in the illustrated embodiments, and any further applications of the principles of the invention as illustrated therein as would normally occur to one skilled in the art to which the invention relates are contemplated and protected. In addition, the compositions used/disclosed herein can also comprise some components other than those cited. In the description, each numerical value should be read once as modified by the term "about" (unless already expressly so modified), and then read again as not so modified unless otherwise indicated in context. Also, in this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

FIG. 1 is a schematic diagram of a system 100 for breaking a fracturing fluid. In certain embodiments, the system 100 includes a subterranean formation 104 having a formation temperature, and a treatment plan for the subterranean formation 104. The treatment plan includes a treatment time, which in certain embodiments includes the time measured from exposing a treatment fluid 116 to a breaker 112 until final placement of the treatment fluid 116 into the formation 104. In certain embodiments, final placement of the treatment fluid 116 into the formation 104 occurs when a pump 114 shuts down or is substantially slowed and a treatment job is considered completed. In certain embodiments, the treatment plan further includes a flowback wait time, which may be the amount of time measured from exposing the treatment fluid 116 to the breaker 112 until fluid from the formation 104 is planned to be flowed back to the surface after a treatment is completed.

In certain embodiments, the treatment fluid 116 includes a carrier fluid 110, a metallic peroxide breaker 112, and an amount of an acid precursor 120. The acid precursor 120, in certain embodiments, includes polylactic acid and/or polyglycolic acid. In certain embodiments, the metallic peroxide breaker 112 dissolves within a first time period at a pH below about 8.5 and at a treatment temperature which is a function of the formation temperature. The treatment temperature may be an estimated temperature, for example based on a total amount of fluid 116 pumped into the formation 104 over a period of time, and may therefore be a different value than the formation temperature.

In certain embodiments, the acid precursor 120 amount is selected such that the treatment fluid 116 generates a pH below about 8.5 at about a second specified time period, where the second specified time period added to the first time period comprises a time greater than the treatment time and less than the flowback wait time. For example, the treatment time may be 25 minutes and the flowback wait time may be 180 minutes. In the example, if the first time period is about 10 minutes, the second specified time period may be selected at a value between 15+ minutes (i.e. any amount of time greater than 15 minutes) and 170− minutes (i.e. any amount of time less than 170 minutes). In the example, any acid precursor 120 concentration that reduces the pH, sometimes below 8.5 at between 15 and 170 minutes may comprise the acid precursor 120 amount. In an alternate example, the treatment time may be about 45 minutes and the flowback wait time may be about 120 minutes. In the alternate example, if the first time period is about 20 minutes (for example, as may occur for a lower formation temperature than the first example), the second specified time period may be selected at a value between 25+ minutes and 100− minutes.

It is understood herein that various factors known to those in the art may be considered in selecting acid precursor amounts and determining the first time period, second time period, treatment time, and flowback wait time. For example, a margin may be included allowing for a shutdown period during a treatment without having the treatment fluid 116 break during the shutdown. In the example, the treatment time may be treated as longer than a designed pump time to allow for such margin. In another example, the treatment time and/or flowback wait time may be treated as continuous variables rather than single discrete values. For example, if a hydraulic fracture treatment is designed to occur over 45 minutes, the treatment time early in the job may be determined as 45 minutes and the flowback wait time may be treated as 180 minutes, where in the example the treatment time 20 minutes into the hydraulic fracture treatment may be treated as 25 minutes and the flowback wait time may be treated as 160 minutes. Such adjustments are mechanical steps for one of skill in the art based on the disclosures herein.

In certain embodiments, the system includes a wellbore 102 intersecting the subterranean formation 104, where the subterranean formation 104 includes a formation temperature. The formation temperature may be a measured or estimated value. In certain embodiments, the system 100 includes a controller 106. In certain embodiments, the controller 106 includes memory, processing, and input/output interfaces, and further includes modules structured to perform operations for breaking a fracturing fluid. The controller 106 may be a single device or a plurality of distributed devices, and may include devices that communicate over a network, datalink, wireless communication, and the like. In certain embodiments, the controller 106 communicates with various sensors and actuators in the system 100 to send or receive information and to send commands. The communications of the controller 106 may be direct signals such as electronic, pneumatic, or hydraulic signals, or the communications may be software or datalink parameters.

In certain embodiments, the controller 106 includes an application definition module, and a breaker data module. In certain further embodiments, the controller 106 includes an acid selection module, a convergence module, a treatment module, and/or a particle sizing module. The description herein including modules emphasizes the structural independence of the aspects of the controller 106, and illustrates one grouping of operations and responsibilities of the controller 106. Other groupings that execute similar overall operations are understood within the scope of the present application. Modules may be implemented in hardware and/or software on computer readable medium, and modules may be distributed across various hardware or software components. More specific descriptions of certain embodiments of controller 106 operations are included in the section referencing FIG. 2.

In certain embodiments, the application definition module identifies application parameter(s) including a subterranean formation temperature. In certain embodiments, the application parameters further include a flowback wait time, a breaker particle composition, a breaker particle size, a gel loading of a carrier fluid 110, a treatment time, and/or a permeability of the subterranean formation.

In certain embodiments, the breaker data module interprets break times corresponding to the application parameter(s). In certain embodiments, the break times corresponding to the application parameter(s) are stored as a set of data values stored on a computer readable medium, and/or as equation (s) stored on a computer readable medium. In certain embodiments, the acid selection module determines an acid precursor concentration in response to the break times corresponding to the application parameter(s).

In certain embodiments, the convergence module determines a convergence value indicating whether an acid precursor concentration is available that provides a treatment break time greater than the treatment time and smaller than the flowback wait time. In certain embodiments, the treatment module provides a recommendation such as a flowback wait time recommendation, a treatment time recommendation, and/or a breaker particle composition recommendation in response to the convergence value indicating that no acid precursor concentration is available that provides a treatment break time greater than the treatment time and smaller than the flowback wait time.

In certain embodiments, the system further includes a blender 108 that provides a treatment fluid 116 having the carrier fluid 110 comprising a hydratable gel, and a metallic peroxide breaker 112, and an acid precursor 120 present in an amount according to the acid precursor concentration. In certain embodiments, the metallic peroxide breaker 112 includes calcium peroxide, magnesium peroxide, strontium peroxide, and/or zinc peroxide. In certain embodiments, the system 100 further includes a pump 114 that receives the treatment fluid 116 and treats the subterranean formation 104 with the treatment fluid.

In certain embodiments, the particle sizing module determines a breaker particle size in response to the break times corresponding to the application parameter(s). In certain embodiments, the convergence module determines a convergence value indicating whether a breaker particle size is available that provides a treatment break time greater than the treatment time and smaller than the flowback wait time. In certain embodiments, the treatment module provides a recommendation including a flowback wait time recommendation, a treatment time recommendation, and/or a breaker particle composition recommendation in response to the convergence value indicating that no breaker particle size is available that provides a treatment break time greater than the treatment time and smaller than the flowback wait time.

In certain embodiments, the system 100 includes a blender 108 that provides a treatment fluid 116 including the carrier fluid 110 comprising a hydratable gel and a granular breaker 112 sized according to the breaker particle size.

In certain embodiments, the treatment break time is the time measured from the addition of the breaker 112 at which the treatment fluid 116 is broken under the conditions (including temperatures, shear rates, etc.) present in the system 100. In certain embodiments, the treatment break time includes a time for the acid precursor 120 to generate a pH that will dissolve the breaker 112, and the time from breaker dissolution to reduction of the treatment fluid 116 viscosity to a desired level (e.g. 0.01 Pa·s). In certain embodiments, the treatment break time includes the dissolution time of the granular breaker 112 particles and the time from breaker dissolution to reduction of the treatment fluid 116 viscosity to a desired level.

In certain embodiments, the system 100 further includes a proppant 118 and delivery of the proppant 118 to the blender 108. The hydratable gel includes any gelling agent known in the art, including without limitation guar-based gels, any polysaccharide, carboxy-methyl-hydroxy-propyl-guar, hydroxy-propyl guar, carboxy-methyl guar, xanthan, cellulose-based gels, hydroxy-ethyl-cellulose, and carboxy-methyl-cellulose.

Figure 2:
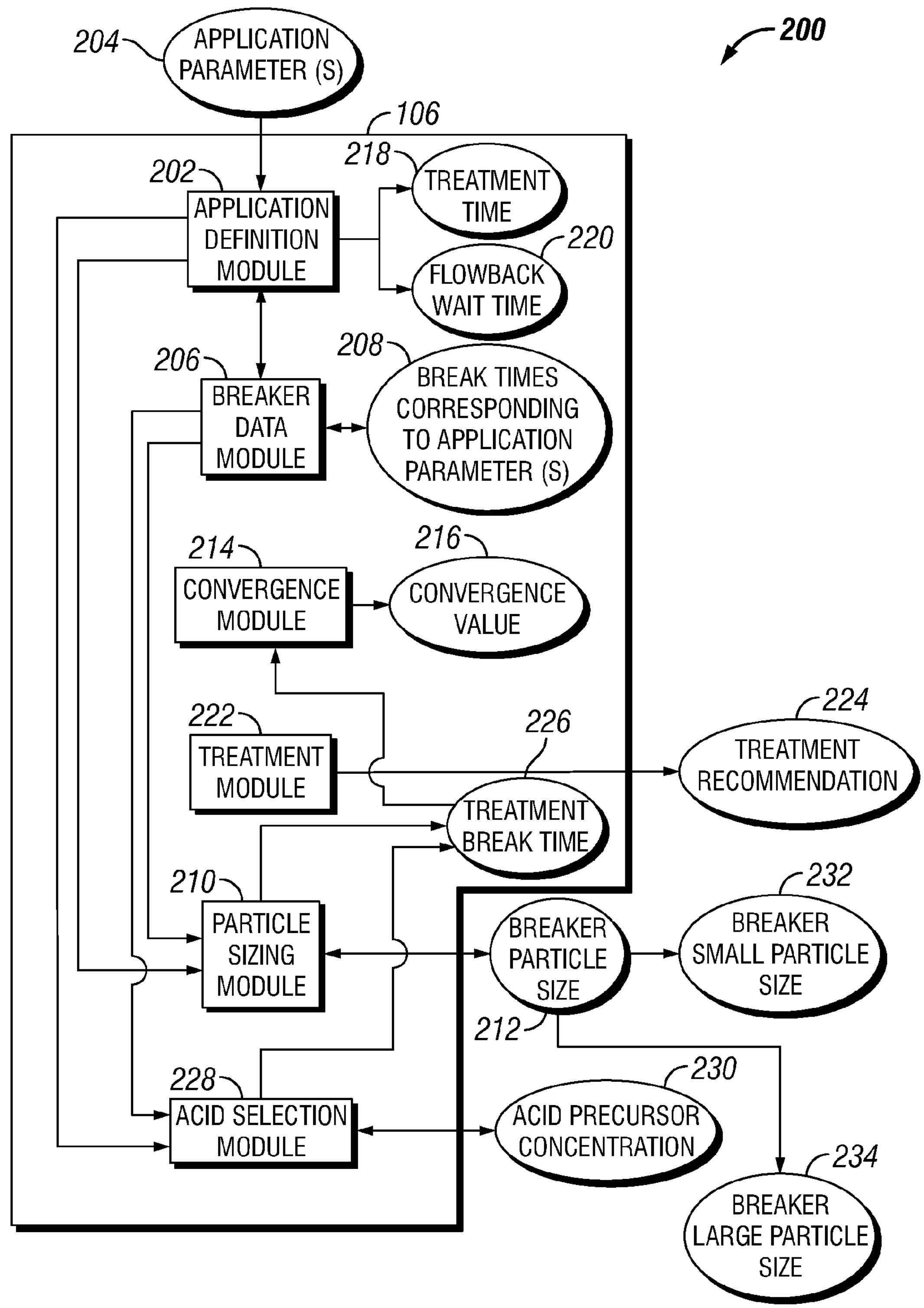
FIG. 2 is a schematic diagram of a processing subsystem.

FIG. 2 is a schematic diagram of a controller 106 which may be part of an apparatus 200 and/or system 100. In certain embodiments, the controller 106 includes an application definition module 202 that identifies application parameter(s) 204 including a subterranean formation temperature. Identifying application parameters(s) 204, as used herein, includes obtaining the parameters 204 by any method including reading parameters from a memory location or a datalink, accepting measured parameter values, accepting parameters as inputs, and/or calculating or determining parameters based upon any other parameters obtained by any method.

In certain embodiments, the application parameter(s) 204 further include a flowback wait time 220, a breaker particle composition, a gel loading of a carrier fluid, a treatment time 218, and/or a permeability of the subterranean formation 104. The application parameter 204 may include any parameter that can affect the breaking time of the treatment fluid 116, and/or any parameter that can affect the desired state of the treatment fluid 116 for considering the treatment fluid 116 to be "broken." For example, adjusting the flowback wait time 220 gives the fluid more or less time before the treatment fluid 116 should be broken, the gel loading of the carrier fluid 110 affects how quickly an acid precursor 120 develops a desired pH level (with greater gel loading generally slowing the time for pH development), and the permeability of the formation 104 is relevant in determining a damage threshold that is economically acceptable and therefore how low the "broken" treatment fluid 116 viscosity should be. Generally, a higher permeability dictates a lower broken viscosity, although in certain embodiments a low permeability and therefore low flow rate dictates a lower broken viscosity.

The application definition module 202 may identify any application parameter 204 understood to be relevant. In certain embodiments, application parameters 204 may be calculated, measured, entered by a user (not shown), and/or estimated from available data. For example, the treatment time 218 may be calculated based upon an entered pump schedule. In certain embodiments, the application definition module 202 may include default data for one or more application parameters 204, and replace one or more elements of default data as better data is available. In certain embodiments, the application definition module 202 provides the treatment time 218, the flowback wait time 220, and/or other application parameters 204 for availability to other modules or portions of the controller 106.

In certain embodiments, the subterranean formation temperature is between 75° C. and 125° C. The breaker 112 may be calcium peroxide for intermediate temperatures such as the range 75° C. and 125° C. In certain embodiments, the subterranean formation temperature is greater than 125° C. The breaker 112 may be magnesium peroxide and/or zinc peroxide for higher temperature ranges such as greater than 125° C. The temperature ranges and breaker 112 compositions are exemplary only, and other values may be utilized or present. In certain embodiments, magnesium peroxide and/or zinc peroxide may be used at lower temperatures where the breaker 112 particle size is generally small, where the concentration of the breaker 112 is generally high, and/or where an acid precursor 120 is used in a high concentration. In certain embodiments, calcium peroxide may be used at higher temperatures where the breaker 112 particle size is generally large, where the concentration of the breaker 112 is generally low, and/or where an acid precursor 120 is used in a low concentration.

In certain embodiments, the breaker 112 particle composition includes calcium peroxide, magnesium peroxide, strontium peroxide, and/or zinc peroxide. In certain embodiments, the metallic peroxide 112 includes calcium peroxide present in an amount of at least 5 pounds per thousand gallons of treatment fluid 116. In certain embodiments, the metallic peroxide 112 includes magnesium peroxide and/or zinc peroxide present in an amount of at least 10 pounds per thousand gallons. In certain embodiments, metallic peroxide includes magnesium peroxide and/or zinc peroxide present in an amount of at least 17 pounds per thousand gallons. In some other embodiments, the metallic peroxide is a fine sized calcium peroxide present in an amount of equal to or less that about 5 pounds per thousand gallons.

In certain embodiments, the controller 106 includes a breaker data module 206 that interprets break times 208 corresponding to the application parameter(s). In certain embodiments, the break times 208 corresponding to the application parameter(s) include a set of data values stored on a computer readable medium and/or equation (s) stored on a computer readable medium. For example, the break times 208 may include a plurality of break times 208 for calcium peroxide particles sized between 40 microns and 2000 microns, and included at 5 pounds per thousand gallons of treatment fluid 116, at 100° C. and at 150° C. In the example, the break times 208 may be stored as equations, as discrete values for an interpolated lookup table, or through other storage means understood in the art.

In certain embodiments, the controller 106 includes an acid selection module 228 that determines an acid precursor concentration 230 in response to the application parameter(s) 204 and the break times 208 corresponding to the application parameter(s). For example, the application parameters 204 may include the formation temperature, a gel loading of the carrier fluid 110, a treatment time 218, and a flowback wait time 220, and the break times 208 may include a plurality of break times 208 for polylactic acid concentrations between 0.6 kg/m3 to 2.5 kg/m3. In the example, the acid selection module 228 determines a concentration of polylactic acid, or a range of concentrations of polylactic acid, that provide a treatment break time 226 within an acceptable time period.

In certain embodiments, the acid precursor 120 includes polylactic acid and/or polyglycolic acid. In certain embodiments, the acid precursor 120 includes an encapsulated acid and/or an emulsified acid. In certain embodiments, the acid precursor concentration 230 is a value between 0.7 kg acid precursor per $m^3$ treatment fluid ($kg/m^3$) and 2.5 $kg/m^3$. In certain embodiments, the acid precursor concentration 230 is between about 0.7 kg $kg/m^3$ and about 5 $kg/m^3$.

In certain embodiments, the controller 106 further includes a convergence module 214 that determines a convergence value 216 indicating whether at least one acid precursor concentration 230 is available that provides a treatment break time 226 greater than the treatment time 218 and smaller than the flowback wait time 220. In certain embodiments, the controller 106 further includes a treatment module 222 that provides a treatment recommendation 224, which may be a recommendation(s) including a flowback wait time recommendation, a treatment time recommendation, and/or a breaker particle composition recommendation. In certain embodiments, the treatment module 222 provides the treatment recommendation 224 in response to the convergence value 216 indicating that no acid precursor concentration 230 is available that provides a treatment break time 226 greater than the treatment time 218 and smaller than the flowback wait time 220.

For example, the treatment time 218 may be 25 minutes and the flowback wait time 220 may be 45 minutes. In the example, if the treatment time 218 is about 20 minutes, the treatment breaktime 226 may be any time between 25 minutes and 45 minutes. If a highest allowable acid precursor concentration 230 provides a treatment break time 226 greater than 45 minutes, the treatment module 222 determines a treatment recommendation 224 that either extends the window between the treatment time 218 and the flowback wait time 220 or that shortens the treatment breaktime 226. In the example, any acid precursor concentration 230 that reduces the pH at between 15 and 170 minutes may comprise the acid precursor 120 amount. In certain embodiments, the treatment module 222 may constrain treatment recommendations 224 to a selected list of parameters 204, or in certain embodiments to a single parameter.

In certain embodiments, the controller 106 includes a particle sizing module 210 that determines a breaker particle size 212 in response to the application parameter(s) 204 and the break times corresponding to the application parameter(s) 208. In certain embodiments, the breaker particle size 212 is between about 40 microns and about 2,000 microns.

In certain embodiments, the breaker particle size 212 includes a breaker small particle size 232 and a breaker large particle size 234, where the breaker large particle size 234 is not greater than 25% larger than the breaker small particle size 232, and where at least 90% of the breaker particles are sized between the breaker small particle size 232 and the breaker large particle size 234, inclusive. For example, the breaker small particle size 232 may be 120 microns, and the breaker large particle size 234 may be a value not greater than 150 microns. In certain embodiments, a breaker small particle size 232 and breaker large particle size 234 are utilized where a relatively narrow range of treatment break times 226 are acceptable for a given application. In certain embodiments, the breaker small particle size 232 and breaker large particle size 234 may be related by a factor wider or narrower than 25%. The use of breakers 112 with wider particle ranges, or sized only according to median particle diameter, and/or with other size specifications are contemplated in the present application. In certain further embodiments, at least 99% of the breaker particles are sized between the breaker small particle size 232 and the breaker large particle size 234, inclusive.

In certain embodiments, the subterranean formation temperature is greater than 125° C., and the metallic peroxide is magnesium peroxide and/or zinc peroxide. In certain embodiments, the subterranean formation temperature is greater than 125° C., and the breaker particle size 212 is sized to at least 1,000 microns.

In certain embodiments, the apparatus further includes a convergence module 214 that determines a convergence value 216 indicating whether a breaker particle size 212 is available that provides a treatment break time 226 greater than the treatment time 218 and smaller than the flowback wait time 220. In certain embodiments, the controller 106 further includes a treatment module 222 that provides a treatment recommendation 224 including a flowback wait time 220 recommendation, a treatment time 218 recommendation, and/or a breaker particle composition recommendation in response to the convergence value 216 indicating that no breaker particle size 212 is available that provides a treatment break time 226 greater than the treatment time 218 and smaller than the flowback wait time 220.

For example, the treatment time 218 may comprise 60 minutes, and the largest available breaker particle size 212 of calcium peroxide breaker 212 particles may provide a treatment break time 226 of 45 minutes at the treatment temperature. In the example, the treatment module 222 may generate a treatment recommendation 224 to increase the gel loading of the carrier fluid 110, to change the breaker composition to magnesium peroxide, to reduce the treatment time 218 (e.g. by reducing a treatment size and/or increase a pump rate) and/or make other treatment recommendations 224 enabled in a specific embodiment and/or understood in the art.

Figure 3:
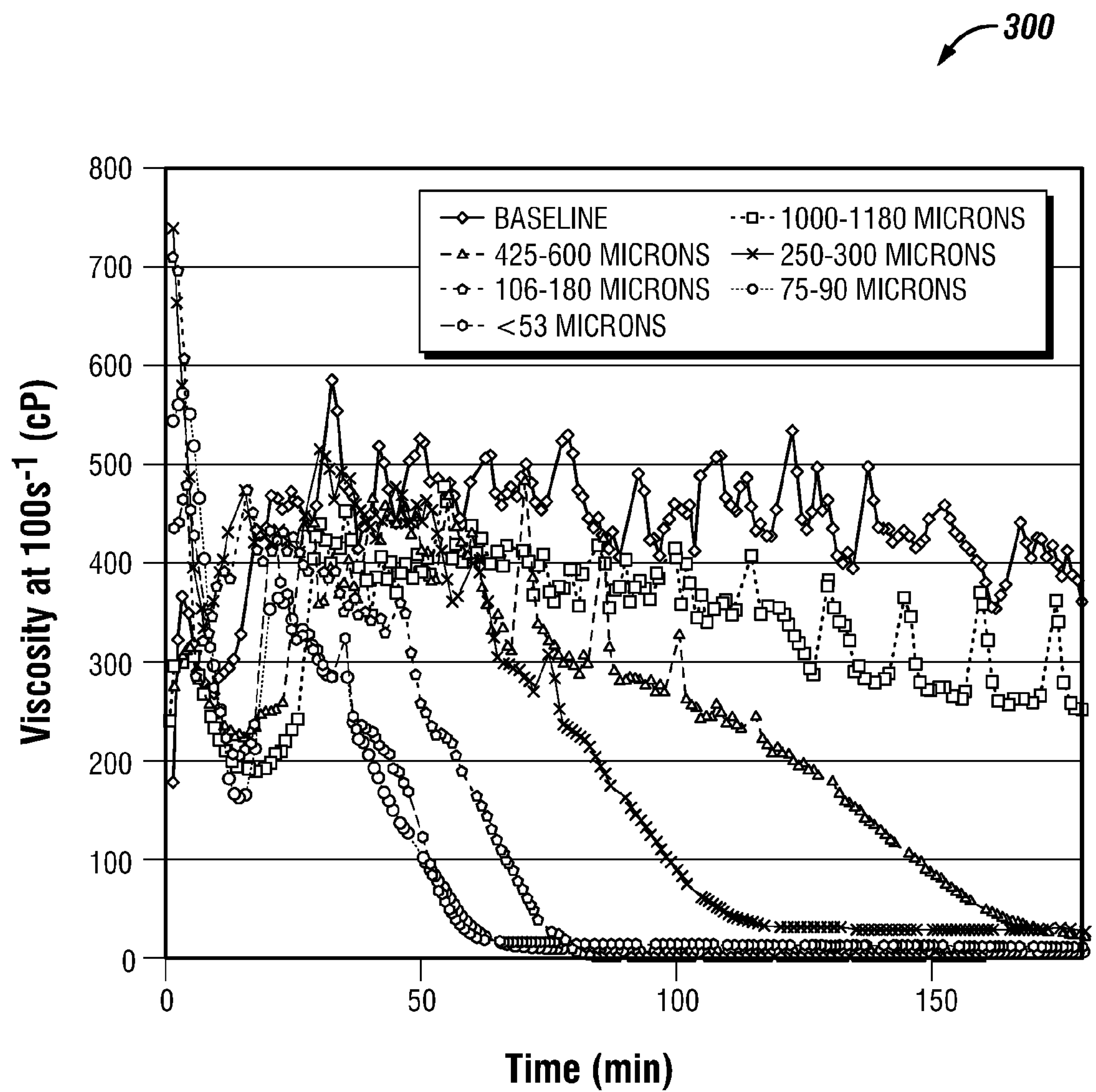
FIG. 3 is an illustration of viscosity-time data corresponding to a plurality of breaker particle sizes.

FIG. 3 is an illustration 300 of viscosity-time data corresponding to a plurality of breaker particle sizes. The viscosity-time data illustrated in FIG. 3 is consistent with data taken for a fracturing fluid having 25 pounds per thousand gallons guar gel, at 175° F., and including 10 pounds per thousand gallons of calcium peroxide at the particle sizes listed. The viscosity data shows breaking times for particles sized from a 425-600 micron range to a below 53 micron range, and the viscosity data shows that particle sizes from 1000-1180 microns did not break at the listed conditions within 180 minutes. The illustration 300 demonstrates readily obtainable data of the type utilized in certain embodiments to generate the break times corresponding to application parameter(s) 208. The data for a particular application should be tailored to the conditions specific for such application.

Figure 4:
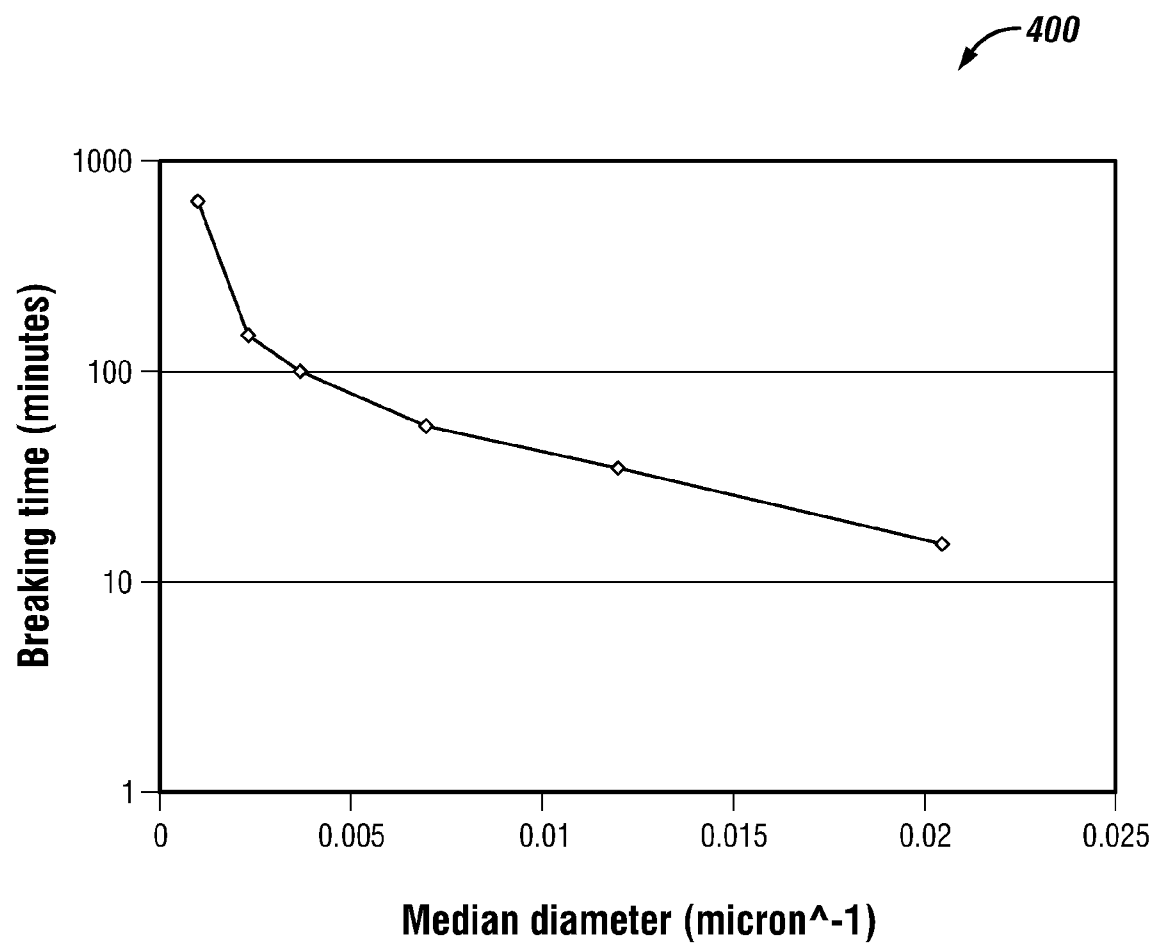
FIG. 4 is an illustration of breaking time data corresponding to a plurality of breaker particle sizes.

FIG. 4 is an illustration 400 of breaking time data corresponding to a plurality of breaker particle sizes 212. The breaking time data illustrated in FIG. 4 is consistent with data taken for a fracturing fluid having 25 pounds per thousand gallons guar, at 175° F., and including 10 pounds per thousand gallons of calcium peroxide at the particle sizes listed. The data is determined according to a selected definition of "breaking", in the illustration of FIG. 4 a viscosity of 0.01 Pa·s (10 cP) was selected. The illustration 400 demonstrates readily obtainable data of the type utilized in certain embodiments to generate the break times corresponding to application parameter(s) 208. The data for a particular application should be tailored to the conditions specific for such application.

Figure 5:
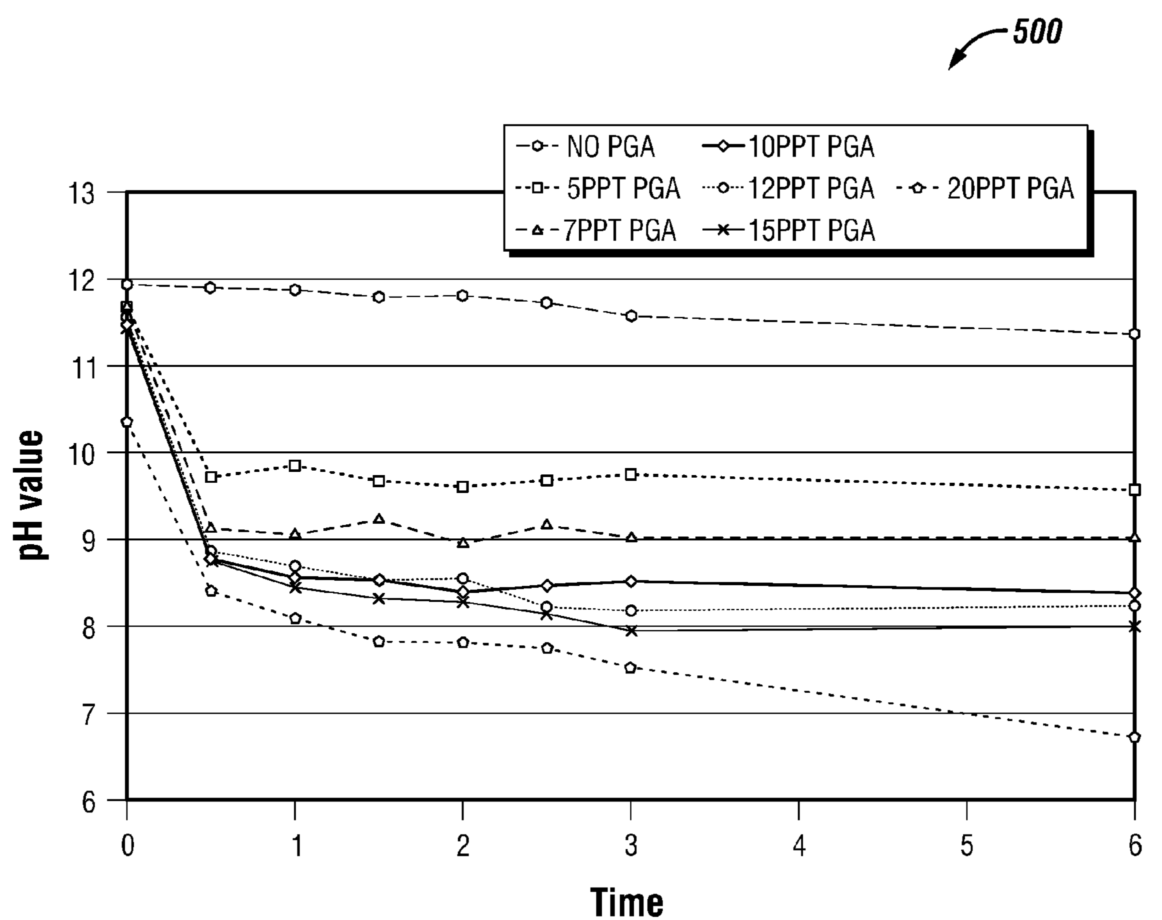
FIG. 5 is an illustration of pH evolution data corresponding to a plurality of acid precursor concentrations.

FIG. 5 is an illustration 500 of pH evolution data corresponding to a plurality of acid precursor concentrations. The pH evolution data illustrated in FIG. 5 is consistent with data taken for a fracturing fluid having 30 pounds per thousand gallons guar, at 225° F., using poly-glycolic acid as an acid precursor at the concentrations illustrated. The illustration 500 demonstrates readily obtainable data of the type utilized in certain embodiments to generate the break times corresponding to application parameter(s) 208. The data for a particular application should be tailored to the conditions specific for such application.

Figure 6:
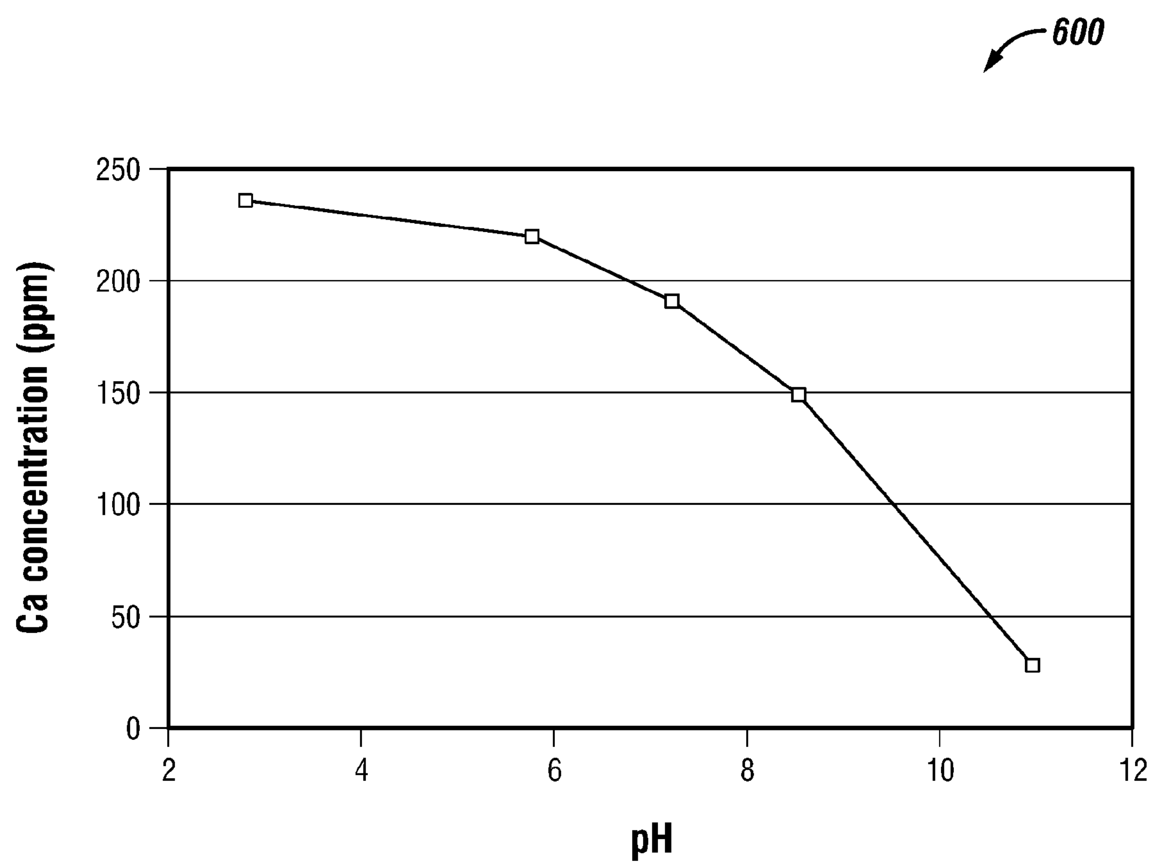
FIG. 6 is an illustration of breaker concentration value data corresponding to a plurality of pH values at a specified time.

FIG. 6 is an illustration 600 of breaker concentration value data corresponding to a plurality of pH values at a specified time. The breaker concentration data illustrated in FIG. 6 is consistent with data taken for an aqueous solution having 5 pounds per thousand gallons calcium peroxide after ten minutes of stirring. The illustration 600 demonstrates readily obtainable data of the type utilized in certain embodiments to generate the break times corresponding to application parameter(s) 208. The data for a particular application should be tailored to the conditions specific for such application.

The schematic flow diagrams and related descriptions which follow provide illustrative embodiments of performing operations for breaking a fracturing fluid. Operations illustrated are understood to be exemplary only, and operations may be combined or divided, and added or removed, as well as re-ordered in whole or part, unless stated explicitly to the contrary herein.

Figure 7:
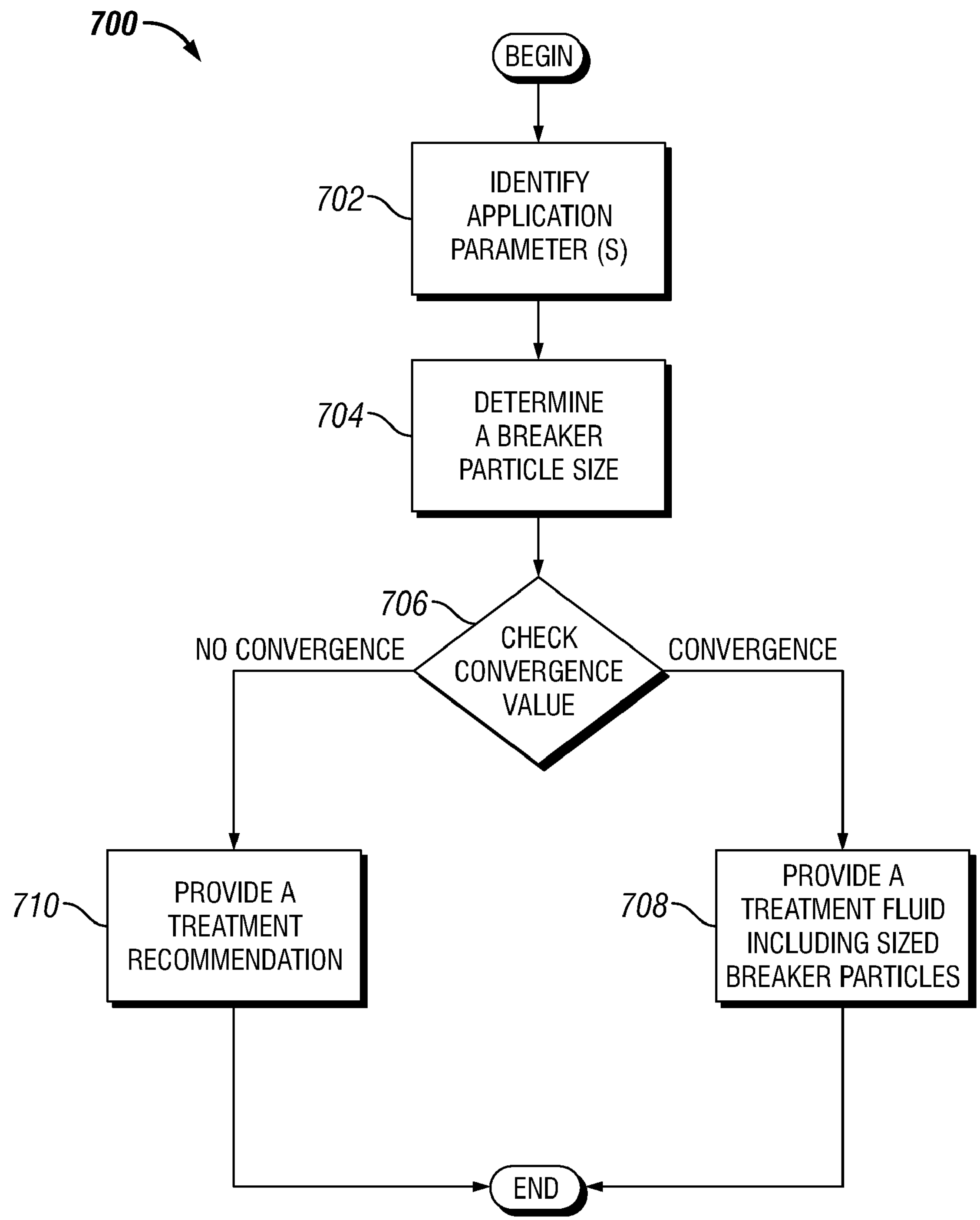
FIG. 7 is a schematic flow diagram of a procedure for selecting a breaker particle size.

FIG. 7 is a schematic flow diagram of a procedure 700 for selecting a breaker particle size. In certain embodiments, the procedure 700 includes an operation 702 to identify application parameter(s) including a subterranean formation temperature, and in further embodiments the application parameter(s) including a flowback wait time, a composition of the metallic peroxide, a gel loading of the carrier fluid, and/or a permeability of the subterranean formation. In certain embodiments, the procedure 700 further includes an operation 704 to determine a breaker particle size in response to the application parameter(s). In certain embodiments, the procedure 700 further includes an operation 706 to determine whether a convergence value indicates that no breaker particle size is available that provides a treatment break time greater than a treatment time and less than a flowback wait time (i.e. "no convergence"). In certain embodiments, in response to the convergence value indicating that at least one breaker particle size is available, the procedure 700 includes an operation 708 to provide a treatment fluid including a carrier fluid and a granular breaker, where the granular breaker includes a particle size according to the breaker particle size, and where the granular breaker is a metallic peroxide. In certain embodiments, in response to the convergence value indicating no convergence, the procedure 700 includes an operation 710 to provide a treatment recommendation. In certain embodiments, the procedure 700 further includes an operation 712 to treat the subterranean formation with the treatment fluid.

Figure 8:
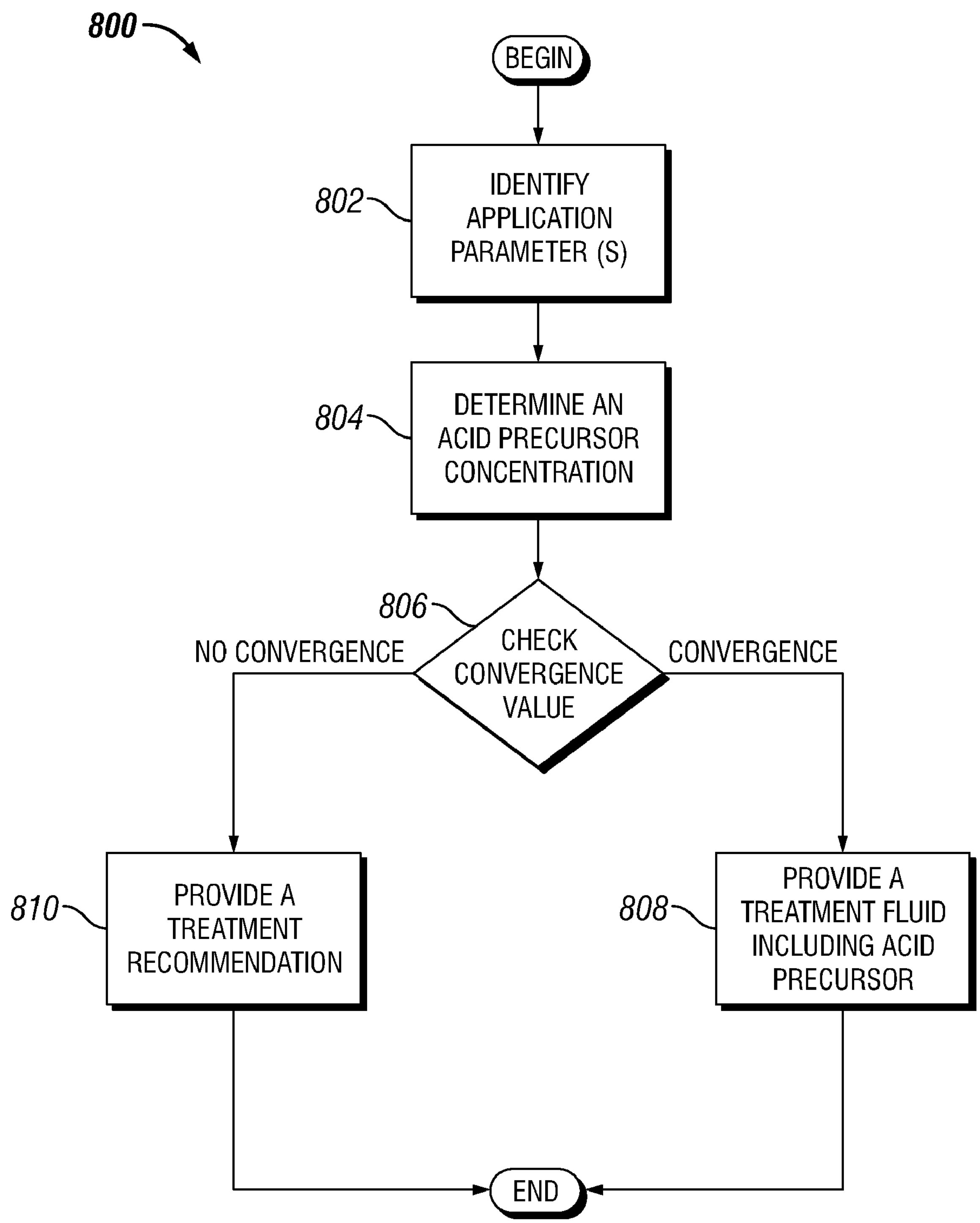
FIG. 8 is a schematic flow diagram of a procedure for determining an acid precursor concentration.

FIG. 8 is a schematic flow diagram of a procedure 800 for selecting an acid precursor concentration. In certain embodiments, the procedure 800 includes an operation 802 to identify application parameter(s) including a subterranean formation temperature, and in further embodiments the application parameter(s) including a flowback wait time, a composition of the metallic peroxide, a gel loading of the carrier fluid, and/or a permeability of the subterranean formation. In certain embodiments, the procedure 800 further includes an operation 804 to determine an acid precursor concentration in response to the application parameter(s). In certain embodiments, the procedure 800 further includes an operation 806 to determine whether a convergence value indicates that no acid precursor concentration is available that provides a treatment break time greater than a treatment time and less than a flowback wait time (i.e. "no convergence"). In certain embodiments, in response to the convergence value indicating that at least one acid precursor concentration is available, the procedure 800 includes an operation 808 to provide a treatment fluid including a carrier fluid, a metallic peroxide breaker, and an amount of an acid precursor according to the acid precursor concentration. In certain embodiments, in response to the convergence value indicating no convergence, the procedure 800 includes an operation 810 to provide a treatment recommendation. In certain embodiments, the procedure 800 further includes an operation 812 to treat the subterranean formation with the treatment fluid.

As is evident from the figures and text presented above, a variety of embodiments according to the present invention are contemplated.

One exemplary embodiment is a system including a wellbore intersecting a subterranean formation, the subterranean formation including a formation temperature and a formation permeability. In certain embodiments, the system includes a controller comprising an application definition module, and a breaker data module. In certain further embodiments, the controller further includes an acid selection module, a convergence module, a treatment module, and/or a particle sizing module.

In certain embodiments, the application definition module identifies application parameter(s) including a subterranean formation temperature. In certain embodiments, the application parameters further include a flowback wait time, a breaker particle composition, a breaker particle size, a gel loading of a carrier fluid, a treatment time, and/or a permeability of the subterranean formation.

In certain embodiments, the breaker data module interprets break times corresponding to the application parameter(s). In certain embodiments, the break times corresponding to the application parameter(s) are stored as a set of data values stored on a computer readable medium, and/or as equation (s) stored on a computer readable medium. In certain embodiments, the acid selection module determines an acid precursor concentration in response to the break times corresponding to the application parameter(s).

In certain embodiments, the convergence module determines a convergence value indicating whether an acid precursor concentration is available that provides a treatment break time greater than the treatment time and smaller than the flowback wait time. In certain embodiments, the treatment module provides a recommendation such as a flowback wait time recommendation, a treatment time recommendation, and/or a breaker particle composition recommendation in response to the convergence value indicating that no acid precursor concentration is available that provides a treatment break time greater than the treatment time and smaller than the flowback wait time.

In certain embodiments, the system further includes a blender that provides a treatment fluid having the carrier fluid comprising a hydratable gel, and a metallic peroxide breaker, and an acid precursor present in an amount according to the acid precursor concentration. In certain embodiments, the metallic peroxide breaker includes calcium peroxide, magnesium peroxide, strontium peroxide, and/or zinc peroxide. In certain embodiments, the system further includes a pump that receives the treatment fluid and treats the subterranean formation with the treatment fluid.

In certain embodiments, the particle sizing module determines a breaker particle size in response to the break times corresponding to the application parameter(s). In certain embodiments, the convergence module determines a convergence value indicating whether a breaker particle size is available that provides a treatment break time greater than the treatment time and smaller than the flowback wait time. In certain embodiments, the treatment module provides a recommendation including a flowback wait time recommendation, a treatment time recommendation, and/or a breaker particle composition recommendation in response to the convergence value indicating that no breaker particle size is available that provides a treatment break time greater than the treatment time and smaller than the flowback wait time.

In certain embodiments, the system includes a blender that provides a treatment fluid including the carrier fluid comprising a hydratable gel and a granular breaker sized according to the breaker particle size.

One exemplary embodiment is an apparatus including an application definition module that identifies application parameter(s) including a subterranean formation temperature. In certain embodiments, the subterranean formation temperature is between 75° C. and 125° C. In certain embodiments, the subterranean formation temperature is greater than 125° C., and in certain further embodiments the breaker particle composition is magnesium peroxide and/or zinc peroxide. In certain embodiments, the application parameter(s) further include a flowback wait time, a breaker particle composition, a gel loading of a carrier fluid, a treatment time, and/or a permeability of the subterranean formation. In certain embodiments, the breaker particle composition includes calcium peroxide, magnesium peroxide, strontium peroxide, and/or zinc peroxide. In certain embodiments, the metallic peroxide includes calcium peroxide present in an amount of at least 5 pounds per thousand gallons. In certain embodiments, the metallic peroxide includes magnesium peroxide and/or zinc peroxide present in an amount of at least 10 pounds per thousand gallons. In certain embodiments, metallic peroxide includes magnesium peroxide and/or zinc peroxide present in an amount of at least 17 pounds per thousand gallons.

In certain embodiments, the apparatus includes a breaker data module that interprets break times corresponding to the application parameter(s). In certain embodiments, the break times corresponding to the application parameter(s) include a set of data values stored on a computer readable medium and/or equation (s) stored on a computer readable medium.

In certain embodiments, the apparatus includes an acid selection module that determines an acid precursor concentration in response to the application parameter(s) and the break times corresponding to the application parameter(s). In certain embodiments, the acid precursor includes polylactic acid and/or polyglycolic acid. In certain embodiments, the acid precursor includes an encapsulated acid and/or an emulsified acid. In certain embodiments, the acid precursor concentration is a value between 0.7 kg acid precursor per $m^3$ treatment fluid ($kg/m^3$) and 2.5 $kg/m^3$. In certain embodiments, the acid precursor concentration is between about 0.6 kg $kg/m^3$ and about 5 $kg/m^3$.

In certain embodiments, the apparatus further includes a convergence module structured that determines a convergence value indicating whether at least one acid precursor concentration is available that provides a treatment break time greater than the treatment time and smaller than the flowback wait time. In certain embodiments, the apparatus further includes a treatment module that provides recommendation(s) including a flowback wait time recommendation, a treatment time recommendation, and/or a breaker particle composition recommendation in response to the convergence value indicating that no acid precursor concentration is available that provides a treatment break time greater than the treatment time and smaller than the flowback wait time.

In certain embodiments, the apparatus includes a particle sizing module that determines a breaker particle size in response to the application parameter(s) and the break times corresponding to the application parameter(s). In certain embodiments, the breaker particle size is between about 40 microns and about 2,000 microns. In certain embodiments, the breaker particle size includes a breaker small particle size and a breaker large particle size, where the breaker large particle size is not greater than 25% larger than the breaker small particle size, and where at least 90% of the breaker particles are sized between the breaker small particle size and the breaker large particle size, inclusive. In certain further embodiments, at least 99% of the breaker particles are sized between the breaker small particle size and the breaker large particle size, inclusive. In certain embodiments, the subterranean formation temperature is greater than 125° C., and the metallic peroxide is magnesium peroxide and/or zinc peroxide. In certain embodiments, the subterranean formation temperature is greater than 125° C., and the breaker particle size is sized to at least 1,000 microns.

In certain embodiments, the apparatus further includes a convergence module that determines a convergence value indicating whether a breaker particle size is available that provides a treatment break time greater than the treatment time and smaller than the flowback wait time. In certain embodiments, the apparatus further includes a treatment module that provides a recommendation including a flowback wait time recommendation, a treatment time recommendation, and/or a breaker particle composition recommendation in response to the convergence value indicating that no breaker particle size is available that provides a treatment break time greater than the treatment time and smaller than the flowback wait time.

One exemplary embodiment is a method including identifying application parameter(s) including a subterranean formation temperature, and in further embodiments including a flowback wait time, a composition of the metallic peroxide, a gel loading of the carrier fluid, and/or a permeability of the subterranean formation. In certain embodiments, the method further includes determining an acid precursor concentration in response to the application parameter(s), providing a treatment fluid including a carrier fluid, a metallic peroxide breaker, and an amount of an acid precursor according to the acid precursor concentration, and treating the subterranean formation with the treatment fluid.

One exemplary embodiment is a method including identifying application parameter(s) including a subterranean formation temperature, and in further embodiments including a flowback wait time, a composition of the metallic peroxide, a gel loading of the carrier fluid, and/or a permeability of the subterranean formation. In certain embodiments, the method further includes determining a breaker particle size in response to the application parameter(s), and providing a treatment fluid including a carrier fluid and a granular breaker, where the granular breaker includes a particle size according to the breaker particle size, and where the granular breaker is a metallic peroxide. In certain embodiments, the method further includes treating the subterranean formation with the treatment fluid.

One exemplary embodiment is a system including a subterranean formation having a formation temperature, and a treatment plan for the subterranean formation. The treatment plan includes a treatment time, a flowback wait time, and a treatment fluid. In certain embodiments, the treatment fluid includes a carrier fluid, a metallic peroxide breaker, and an amount of an acid precursor. The acid precursor, in certain embodiments, includes polylactic acid and/or polyglycolic acid. In certain embodiments, the metallic peroxide breaker dissolves within a first time period at a pH below about 8.5 and at a treatment temperature which is a function of the formation temperature. In certain embodiments, the acid precursor amount is selected such that the treatment fluid generates a pH below about 8.5 at about a second specified time period, where the second specified time period added to the first time period comprises a time greater than the treatment time and less than the flowback wait time.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus, comprising:

an application definition module structured to identify at least one application parameter comprising a subterranean formation temperature, the at least one application parameter further comprising at least one member selected from the group consisting of a flowback wait time, a breaker particle composition, a gel loading of a carrier fluid, a treatment time, and a permeability of the subterranean formation;

a breaker data module structured to interpret a plurality of break times corresponding to the at least one application parameter; and an acid selection module structured to determine an acid precursor concentration in response to the at least one application parameter and the plurality of break times corresponding to the at least one application parameter.

2. The apparatus of claim 1, further comprising a convergence module structured to determine a convergence value indicating whether at least one acid precursor concentration is available that provides a treatment break time greater than the treatment time and smaller than the flowback wait time.

3. The apparatus of claim 2, further comprising a treatment module structured to provide at least one recommendation selected from the group consisting of a flowback wait time recommendation, a treatment time recommendation, and a breaker particle composition recommendation in response to the convergence value indicating that no acid precursor concentration is available that provides a treatment break time greater than the treatment time and smaller than the flowback wait time.

4. The apparatus of claim 1, wherein the breaker particle composition is at least one of calcium peroxide, magnesium peroxide, strontium peroxide, and zinc peroxide.

5. The apparatus of claim 1, wherein the acid precursor is at least one of polylactic acid and polyglycolic acid.

6. The apparatus of claim 5, wherein the acid precursor concentration is between 0.6 kg acid precursor per $m^3$ treatment fluid (kg/m3) and 2.5 kg/$m^3$.

7. The apparatus of claim 1, wherein the subterranean formation temperature comprises a temperature value between 75° C. and 125° C.

8. The apparatus of claim 1, wherein the plurality of break times corresponding to the at least one application parameter comprises one of a set of data values stored on a computer readable medium and at least one equation stored on a computer readable medium.

9. A system, comprising:

a wellbore intersecting a subterranean formation, the subterranean formation including a formation temperature;

a controller comprising:

an application definition module structured to identify at least one application parameter comprising a subterranean formation temperature, the at least one application parameter further comprising at least one member selected from the group consisting of a flowback wait time, a breaker particle composition, a breaker particle size, a gel loading of a carrier fluid, a treatment time, and a permeability of the subterranean formation;

a breaker data module structured to interpret a plurality of break times corresponding to the at least one application parameter; and an acid selection module structured to determine an acid precursor concentration in response to the at least one application parameter and the plurality of break times corresponding to the at least one application parameter;

a blender that provides a treatment fluid comprising:

the carrier fluid comprising a hydratable gel;

a metallic peroxide breaker; and an acid precursor present in an amount according to the acid precursor concentration; and a pump that receives the treatment fluid and treats the subterranean formation with the treatment fluid.

10. The system of claim 9, wherein the controller further comprises a convergence module structured to determine a convergence value indicating whether at least one acid precursor concentration is available that provides a treatment break time greater than the treatment time and smaller than the flowback wait time.

11. The system of claim 10, wherein the controller further comprises a treatment module structured to provide at least one recommendation selected from the group consisting of a flowback wait time recommendation, a treatment time recommendation, and a breaker particle composition recommendation in response to the convergence value indicating that no acid precursor concentration is available that provides a treatment break time greater than the treatment time and smaller than the flowback wait time.

12. The system of claim 9, wherein the breaker particle composition comprises at least member selected from the group consisting of calcium peroxide, magnesium peroxide, strontium peroxide, and zinc peroxide.

13. The system of claim 9, wherein the plurality of break times corresponding to the at least one application parameter comprise one of a set of data values stored on a computer readable medium and at least one equation stored on a computer readable medium.

* * * * *